United States Patent [19]

Mahalingaiah

[11] Patent Number: 5,961,580
[45] Date of Patent: Oct. 5, 1999

[54] APPARATUS AND METHOD FOR EFFICIENTLY CALCULATING A LINEAR ADDRESS IN A MICROPROCESSOR

[75] Inventor: Rupaka Mahalingaiah, Austin, Tex.

[73] Assignee: Advanced Micro Devices, Inc., Sunnyvale, Calif.

[21] Appl. No.: 08/603,803

[22] Filed: Feb. 20, 1996

[51] Int. Cl.⁶ ....................................................... G06F 7/50
[52] U.S. Cl. .......................................... 708/670; 711/220
[58] Field of Search ...................... 364/768; 395/421.1, 395/562; 708/670; 711/220

[56] References Cited

U.S. PATENT DOCUMENTS

| | | | |
|---|---|---|---|
| 4,373,182 | 2/1983 | Schultz et al. | 364/200 |
| 4,409,654 | 10/1983 | Wada et al. | 364/200 |
| 4,858,105 | 8/1989 | Kuriyama et al. | 364/200 |
| 5,185,871 | 2/1993 | Frey et al. | 395/375 |
| 5,204,953 | 4/1993 | Dixit | 395/421.1 |
| 5,233,553 | 8/1993 | Shak et al. | 364/768 |
| 5,274,776 | 12/1993 | Senta | 395/375 |
| 5,345,569 | 9/1994 | Tran | 395/375 |
| 5,408,626 | 4/1995 | Dixit | 395/421.1 |
| 5,423,013 | 6/1995 | Baum et al. | 395/400 |
| 5,434,987 | 7/1995 | Abramson et al. | 395/567 |
| 5,511,017 | 4/1996 | Cohen et al. | 364/746 |
| 5,517,657 | 5/1996 | Rodgers et al. | 395/800 |
| 5,519,841 | 5/1996 | Sager et al. | 395/412 |
| 5,524,263 | 6/1996 | Griffth et al. | 395/800 |
| 5,546,593 | 8/1996 | Kimura et al. | 395/800 |
| 5,559,975 | 9/1996 | Christie et al. | 395/325 |
| 5,568,630 | 10/1996 | Killian et al. | 395/375 |
| 5,590,297 | 12/1996 | Huck et al. | 395/401 |
| 5,590,352 | 12/1996 | Zuraski, Jr. et al. | 395/800 |
| 5,612,911 | 3/1997 | Timko | 364/768 |
| 5,615,350 | 3/1997 | Hesson et al. | 395/394 |
| 5,655,139 | 8/1997 | Thomson et al. | 395/421.1 |
| 5,664,137 | 9/1997 | Abramson et al. | 395/392 |

OTHER PUBLICATIONS

IBM Technical Disclosure Bulletin, "Dual Load/Store Unit With a Single Port Cache", vol. 38, No. 8, Aug. 1995. pp. 11–15.

*Primary Examiner*—David H. Malzahn
*Attorney, Agent, or Firm*—Conley, Rose, & Tayon, PC; B. Noel Kivlin; Lawerence J. Merkel

[57] ABSTRACT

A linear address generation apparatus is provided which adds the segment base address to the displacement provided in the instruction while the instruction is being decoded. The linear and logical address generation are combined. Whereas linear address generation may have formerly required 2–3 clock cycles, 1–2 clock cycles may be achieved using the apparatus disclosed herein. The reduced latency in generating linear addresses may lead to reduced data access latency, and further may lead to increased performance in a microprocessor employing the apparatus. Performance increases are derived from the reduced number of clock cycles required for execution of memory accesses, and due to instructions dependent upon the memory accesses receiving data more quickly. For embodiments of the microprocessor employing the x86 microprocessor architecture, the apparatus additionally detects an arithmetic carry from low order bits of the addition to higher order bits of the addition. If the microprocessor is executing in 16 bit addressing mode, the logical address is truncated to 16 bits prior to adding the address to the 32 bit segment base address. Because the additions performed in this embodiment are 32 bit additions, the truncation to 16 bits is lost. Therefore, a carry from the low order 16 bits to the high order 16 bits is detected. If the instruction is executed in 16 bit addressing mode and a carry is detected, then the microprocessor causes an exception. The instruction is then handled by a microcode unit.

20 Claims, 7 Drawing Sheets

APPARATUS AND METHOD FOR EFFICIENTLY CALCULATING A LINEAR ADDRESS IN A MICROPROCESSOR

BACKGROUND OF THE INVENTION

1. Field of the Invention

This invention is related to the field of microprocessors and, more particularly, to address calculation mechanisms within microprocessors.

2. Description of the Relevant Art

Superscalar microprocessors achieve high performance by simultaneously executing multiple instructions during a clock cycle and by specifying the shortest possible clock cycle consistent with the design. As used herein, the term "clock cycle" refers to an interval of time during which the pipeline stages of a microprocessor perform their intended functions. Storage devices (e.g. registers or arrays) capture their values in response to a clock signal defining the clock cycle. For example, storage devices may capture a value in response to a rising or falling edge of the clock signal.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture includes an address translation mechanism. Address translation involves the mapping of an address created by the microprocessor to an address actually used to access memory. Address translation mechanisms are employed for many reasons. For example, the address translation mechanism may be used to define certain microprocessor-created addresses as not presently stored within the main memory. Data corresponding to addresses which are not stored within main memory may be stored on a disk drive. When such an address is accessed, the corresponding data may be swapped with data currently stored in main memory. The address translation for the data swapped onto the disk drive is invalidated and an address translation is defined for the data swapped into memory. In this manner, the computer program may access an address space larger than the main memory can support. Additionally, address translation mechanisms are used to protect the data used by one program from access and modification by another program executing within the same computer system. Different areas of main memory are allocated to each program, and the translations for each program are constrained such that any address created by one program does not translate to a memory location allocated to another program. Many other reasons for employing address translation mechanisms are well known.

The x86 address translation mechanism includes two levels. A first level, referred to as segmentation, takes a logical address generated according to instruction operands and produces a linear address. The second level, referred to as paging, translates the linear address to a physical address (i.e. the address actually used to access memory). The linear address is equal to the physical address in cases where the paging mechanism is disabled.

For a particular data access to memory, the logical address comprises the result of adding certain operands defined by the instruction. As used herein, the term "operand" refers to an input value operated upon by an instruction. Operands are referred to as register operands if the value is stored in a register within the microprocessor. Conversely, operands are referred to as memory operands if the value is stored in a memory location. The memory location is identified by forming a data address. In the x86 microprocessor architecture, an instruction may form the logical data address of a memory operand using up to two register values and up to one displacement value. The displacement is a value encoded into a particular field of the instruction, and is intended for use in forming the logical data address. The register values used to form the logical data address are also referred to herein as register operands.

Upon generating the logical address, the linear address may be generated. A set of segment registers and associated "shadow registers" store segmentation translation information. The segment selectors are accessible via instructions, while the shadow registers are accessible only to microprocessor hardware. As used herein, the term "segment registers" will be used to refer to the segment registers and associated shadow registers. Each instruction accesses a particular segment register by default when forming linear addresses. Additionally, an instruction may specify a segment register other than the default via an instruction prefix defined in the x86 microprocessor architecture.

Generally speaking, segmentation translation information includes a segment base address, a segment limit, and segment access information. The segment base address is the linear address defined for a logical address having the arithmetic value of zero. Linear addresses within the segment have an arithmetic value which is greater than or equal to the segment base address. The segment limit defines the largest logical address which is within the segment. Logical addresses larger than the segment limit result in an exception being generated by the microprocessor. The segment access information indicates if the segment is present in memory, the type of segment (i.e. code or data, and various subtypes), the addressing mode of the segment, etc. The linear address corresponding to a particular logical address is the result of adding the segment base address to the logical address. Additional information regarding the x86 address translation mechanism may be found in the publication: "PC Magazine Programmer's Technical Reference: The Processor and Coprocessor" by Hummel, Ziff-Davis Press, Emeryville, Calif., 1992. This publication is incorporated herein by reference in its entirety.

As used herein, the term "exception" refers to an interruption in the execution of an instruction code sequence. The exception is typically reported to a centralized handling mechanism which determines an appropriate response to the exception. Some exceptions (such as branch misprediction, for example) may be handled by the microprocessor hardware. The hardware performs corrective actions and then restarts instruction execution. Other exceptions may cause a microcode routine within the microprocessor to be executed. The microcode routine corrects the problem corresponding to the exception. Instruction execution may subsequently be restarted at the instruction causing the exception or at another instruction subsequent to the instruction, dependent upon the corrective actions taken. A third type of exception causes execution of special instruction code stored at an address defined for the exception. The special instruction code determines the reason for the exception and any corrective actions. The third type of exception is architecturally defined, such that software may be written to handle the exception. Upon execution of a particular instruction (a return instruction), instruction execution is typically restarted at the instruction which causes the exception. Segment limit violations are an example of the third type of exception. Selection of which method to handle a particular exception with in a microprocessor is dependent upon the relative frequency at which the exception occurs, and the associated performance impact of handling the exception in the various different manners.

Unfortunately, the generation of a logical address involving up to three operands followed by generation of a linear address from the logical address leads to significant latency in data accesses. Because the logical address may depend upon registers, it is typically not generated until the associated instruction arrives in a functional unit. Generating the logical address typically requires one to two clock cycles (depending upon the number of operands), followed by a linear address generation requiring yet another clock cycle. Delays in address generation result in delays in receiving the accessed data. Instructions dependent upon the accessed data are thereby delayed from executing as well. A mechanism for decreasing the latency involved in generating a linear address is therefore desired.

SUMMARY OF THE INVENTION

The problems outlined above are in large part solved by a linear address generation apparatus in accordance with the present invention. The apparatus adds the segment base address to the displacement provided in the instruction while the instruction is being decoded. Advantageously, the linear and logical address generation are combined. Whereas linear address generation may have formerly required 2–3 clock cycles, 1–2 clock cycles may be achieved using the apparatus disclosed herein. The reduced latency in generating linear addresses may lead to reduced data access latency, and further may lead to increased performance in a microprocessor employing the apparatus. Performance increases are derived from the reduced number of clock cycles required for execution of memory accesses. Additionally, performance increases may be enjoyed due to instructions dependent upon the memory accesses receiving data more quickly.

A microprocessor which was formerly configured with a four input adder for adding two register operands, a displacement, and a segment base in a single clock cycle may also benefit from the present invention. The four input adder may be replaced by a two input adder for forming the sum of the displacement and the segment base address, along with a three input adder for forming the sum of the two register operands and the sum from the two input adder. Advantageously, clock cycle time for the microprocessor may be improved via deletion of the four input adder. The two input add of the displacement and segment base address may be performed during decode of the instruction.

For embodiments of the microprocessor employing the x86 microprocessor architecture, the apparatus additionally detects an arithmetic carry from low order bits of the addition to higher order bits of the addition. In particular, an embodiment employing 32 bit linear addresses detects a carry from the low order 16 bits to the high order 16 bits. If the microprocessor is executing in 16 bit addressing mode, the logical address is truncated to 16 bits prior to adding the address to the 32 bit segment base address. Because the additions performed in this embodiment are 32 bit additions (in order to add the segment base address to the displacement during instruction decode), the truncation to 16 bits is lost. Therefore, a carry from the low order 16 bits to the high order 16 bits is detected. If the instruction is executed in 16 bit addressing mode and a carry is detected, then the microprocessor causes an exception. The instruction is then handled by a microcode unit in order to execute correctly. Advantageously, correct execution in 16 bit addressing mode is maintained while still enjoying the performance benefits of the present apparatus when a carry is not generated. Typically, the carry is not generated and therefore the performance benefit may be often realized.

Broadly speaking, the present invention contemplates an apparatus for computing a linear address, comprising a plurality of registers, a first adder circuit, and a second adder circuit. The plurality of registers are configured to store a plurality of segment base addresses. Coupled to receive one of the plurality of segment base addresses from the plurality of segment registers, the first adder circuit is configured to add the selected segment base address to a displacement corresponding to an instruction. The first adder thereby produces a first sum. The second adder receives the first sum and adds the first sum to an operand of the instruction, thereby producing a second sum.

The present invention further contemplates a method for calculating a linear address corresponding to an instruction within a microprocessor. A segment base address is added to a displacement corresponding to the instruction, thereby producing a first sum. The first sum is produced by a first adder circuit within the microprocessor. Using a second adder circuit, the microprocessor adds the first sum to a first operand of the instruction, thereby producing a second sum. The second sum is subsequently added to a second operand of the instruction if the instruction includes the second operand. A third sum is thereby produced by a third adder circuit within the microprocessor. The second sum comprises the linear address if the second operand is omitted from the instruction. Otherwise, the third sum comprises the linear address.

BRIEF DESCRIPTION OF THE DRAWINGS

Other objects and advantages of the invention will become apparent upon reading the following detailed description and upon reference to the accompanying drawings in which.

Figure 1:
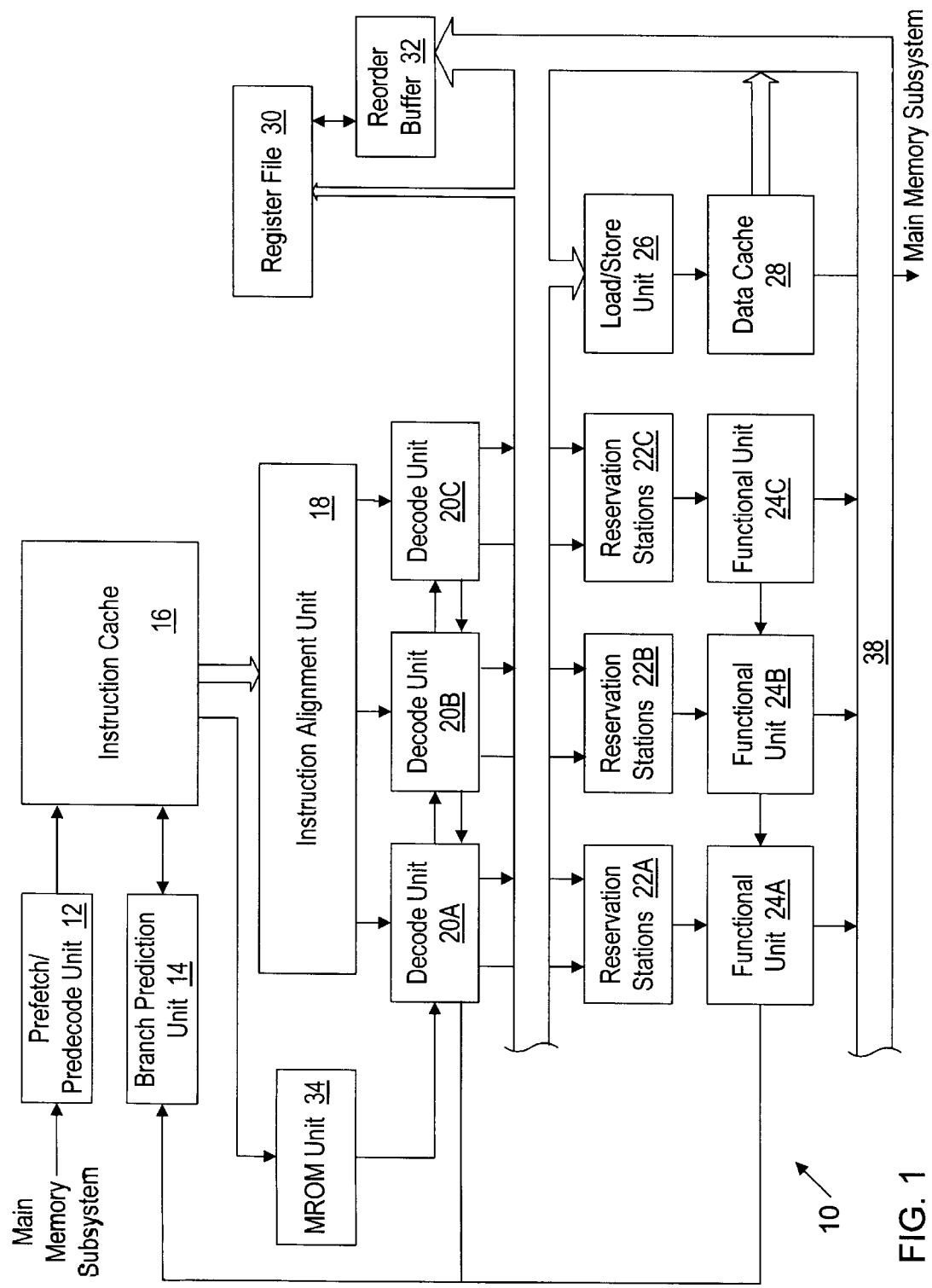
FIG. 1 is a block diagram of a superscalar microprocessor including a plurality of decode units, a plurality of reservation stations, a plurality of functional units, a load/store unit, and a reorder buffer.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is coupled to instruction cache 16. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, microprocessor 10 is configured to "hide" the linear address generation for data accesses within the logical address generation. Effectively, the logical and linear address calculations are merged. Decode units 20 receive the segment base addresses corresponding to each segment register from load/store unit 26. Decode units 20 select one of the segment base addresses dependent upon the default segment register corresponding to the instruction being decoded, as well as dependent upon any overriding specification via a prefix byte within the instruction. Decode units 20 add the selected segment base address to the displacement coded into the instruction. If no displacement is included, a displacement value of zero is used. The sum is conveyed to the corresponding reservation stations 22 and subsequently to the corresponding functional units 24. Functional units 24 receive the sum and add register operands (according to the instruction encoding) thereto. In other words, functional units 24 handle the sum as if the sum were the displacement and functional units 24 were forming the logical address. When functional units 24 have completed adding any register operands specified by the instruction, the linear address has been successfully created. Advantageously, the clock cycle previously devoted to generating the linear address from the logical address is eliminated. Instead, the segment base address is added into the address operands while the corresponding instruction is decoded.

Linear address generation latency is decreased, decreasing overall data access time. In one particular embodiment, linear address generation is decreased from 2–3 clock cycles of address calculation in functional units 24 and load/store unit 26 (dependent upon the number of logical address operands) to 1–2 clock cycles of address calculation. In other words, address calculation time within functional units 24 and load/store unit 26 is decreased by up to 50%. It is noted that, in the absence of the presently described apparatus, load/store unit 26 typically performs the logical to linear address calculation upon receipt of the logical address from one of functional units 24. Microprocessor 10 may enjoy increased performance due to the decreased latency of linear address generation.

In one embodiment, microprocessor 10 generates 32 bit linear addresses. Additionally, segment base addresses are 32 bits. However, for compatibility with previous versions of x86 microprocessors, logical addresses may be 16 bit or 32 bit values. A bit within the segment access information for the code segment (i.e. the segment represented by the CS segment register) indicates whether logical addresses are 16 bit or 32 bit values. Additionally, instructions may override the bit with a prefix byte (similar to overriding the default segment register).

When 16 bit logical addresses are used, another problem is incurred. The displacement and any register operands are added together and the result truncated to 16 bits to form the logical address (i.e. prior to adding the result to the segment base address). By adding the segment base address (comprising 32 bits) to the displacement and subsequently adding the generated 32 bit sum to any register operands, the truncation to 16 bits is lost. Therefore, decode units 20 and functional units 24 are configured to detect an arithmetic carry between the least significant 16 bits and the most significant 16 bits during each addition performed to generate a data address. If the logical data address is 16 bits and a carry is detected, microprocessor 10 generates an exception for the associated instruction. The exception may be handled by MROM unit 34 in a microcode routine. The frequency of occurrence of the carry is often low, allowing use of a microcode routine without deleteriously affecting performance. Advantageously, linear addresses are correctly generated for the 16 bit logical addresses while still enjoying the benefits of adding the segment base address early when no carry is detected.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 16 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

|                 |       |
|-----------------|-------|
| Start bits      | 10000 |
| End bits        | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below. It is noted that MROM unit 34 is often referred to as a "microcode unit".

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred By contrast, a variable amount of storage is allocated in conventional reorder buffers, dependent upon the number of instructions actually dispatched. A comparatively larger number of logic gates may be required to allocated the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding purposes.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Although the above description discusses adding two register operands, a displacement, and a segment base address to form a linear address, other values may be included in linear address generation as well. In particular, if microprocessor 10 employs the x86 microprocessor architecture, microprocessor 10 may be configured to generate a constant value indicative of modification of the ESP or EBP register. These registers are often incremented or decremented by a constant value in response to execution of instructions. For example, the POP instruction in 32 bit addressing mode increments the ESP by 4. Similarly, the PUSH instruction decrements the ESP by 4 in 32 bit mode. Instruction alignment unit 18 may be configured to generate a constant for a particular instruction indicative of modification of the ESP or EBP value by those instructions to be concurrently decoded with the particular instruction by microprocessor 10. The constant indicates modification of the ESP or EBP by concurrently decoded instructions which are prior to the particular instruction in program order. Reorder buffer 32 provides a reorder buffer tag indicative of the ESP and EBP value prior to execution of the concurrently decoded instructions. When the ESP or EBP value prior to execution of the concurrently decoded instructions is generated, each of the concurrently decoded instructions which requires the ESP or EBP captures the value and adds the constant to the value to generate the appropriate register operand for use by the instruction. The apparatus described herein may be configured to accept the constant as an additional operand. Additional information may be found in the commonly assigned, co-pending patent application entitled "A Reorder Buffer Including a Speculative Register File Configured to Store Line-Oriented Speculative Register States", Ser. No. 08/550,218, filed Oct. 30, 1995 by Tran, et al. and "A Speculative Register File for Storing Speculative Register States and Removing Dependencies Between Instructions Utilizing the Register", Ser. No. 08/549,961, filed Oct. 30, 1995 by Tran, et al. The referenced patent applications are incorporated herein by reference in their entirety.

Figure 2:
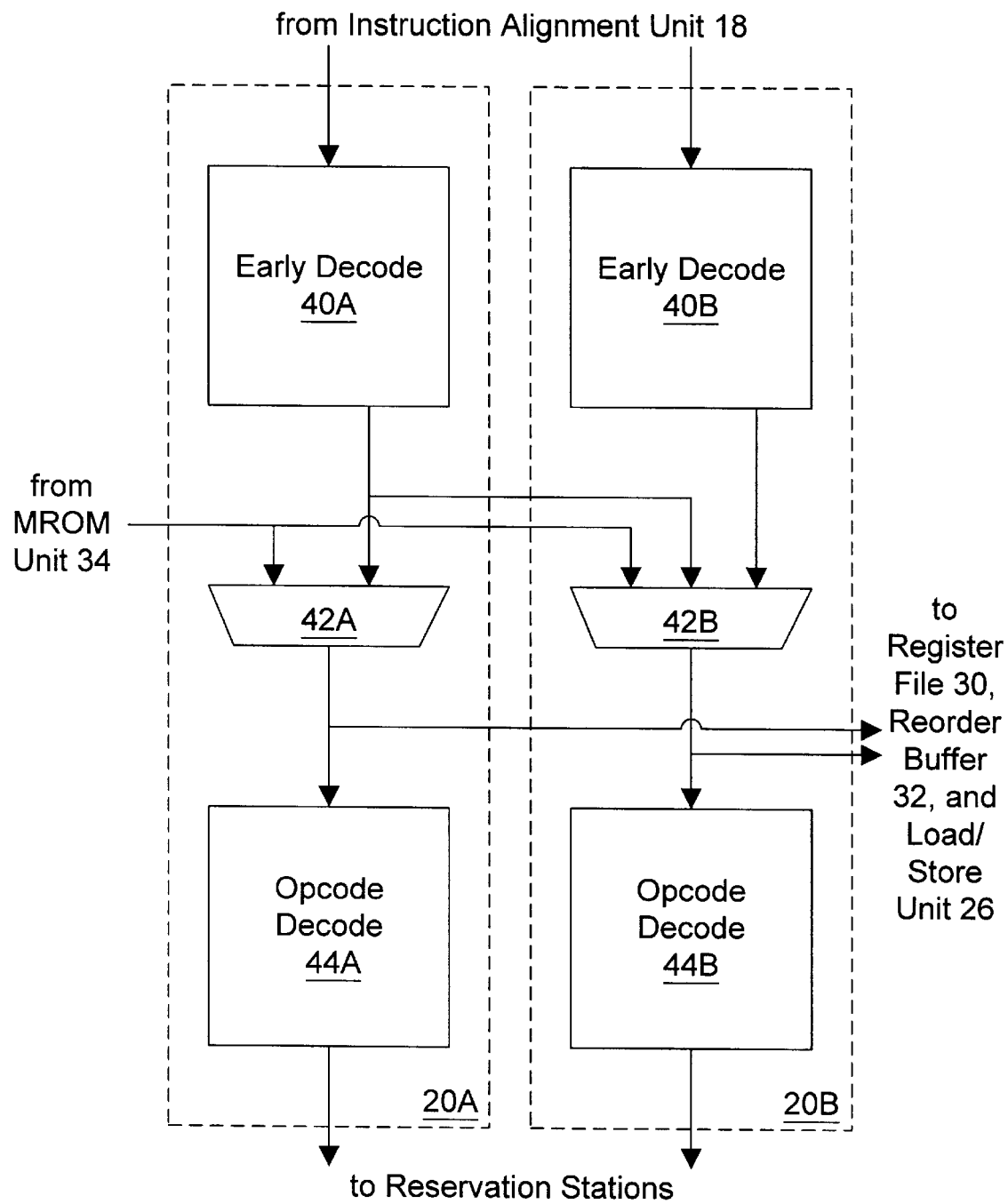
FIG. 2 is a block diagram of one embodiment of two of the decode units shown in FIG. 1.

Turning now to FIG. 2, a block diagram of one embodiment of decode units 20A and 20B are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20A comprises early decode unit 40A, multiplexor 42A, and opcode decode unit 44A. Similarly, decode unit 20B includes early decode unit 40B, multiplexor 42B, and opcode decode unit 44B.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42A is included for selecting between the instructions provided by MROM unit 34 and by early decode unit 40A. During times in which MROM unit 34 is dispatching instructions, multiplexor 42A selects instructions provided by MROM unit 34. At other times, multiplexor 42A selects instructions provided by early decode unit 40A. Similarly, multiplexor 42B selects between instructions provided by MROM unit 34, early decode unit 40A, and early decode unit 40B. The instruction from MROM unit 34 is selected during times in which MROM unit 34 is dispatching instructions. During times in which early decode unit 40A detects a fast path instruction having an SIB byte, the instruction from early decode unit 40A is selected by multiplexor 42B. Otherwise, the instruction from early decode unit 40B is selected. When early decode unit 40A detects a fast path instruction having an SIB byte, an instruction for calculating the address specified by the SIB byte is dispatched to opcode decode unit 44A. Opcode decode unit 44B receives the fast path instruction.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
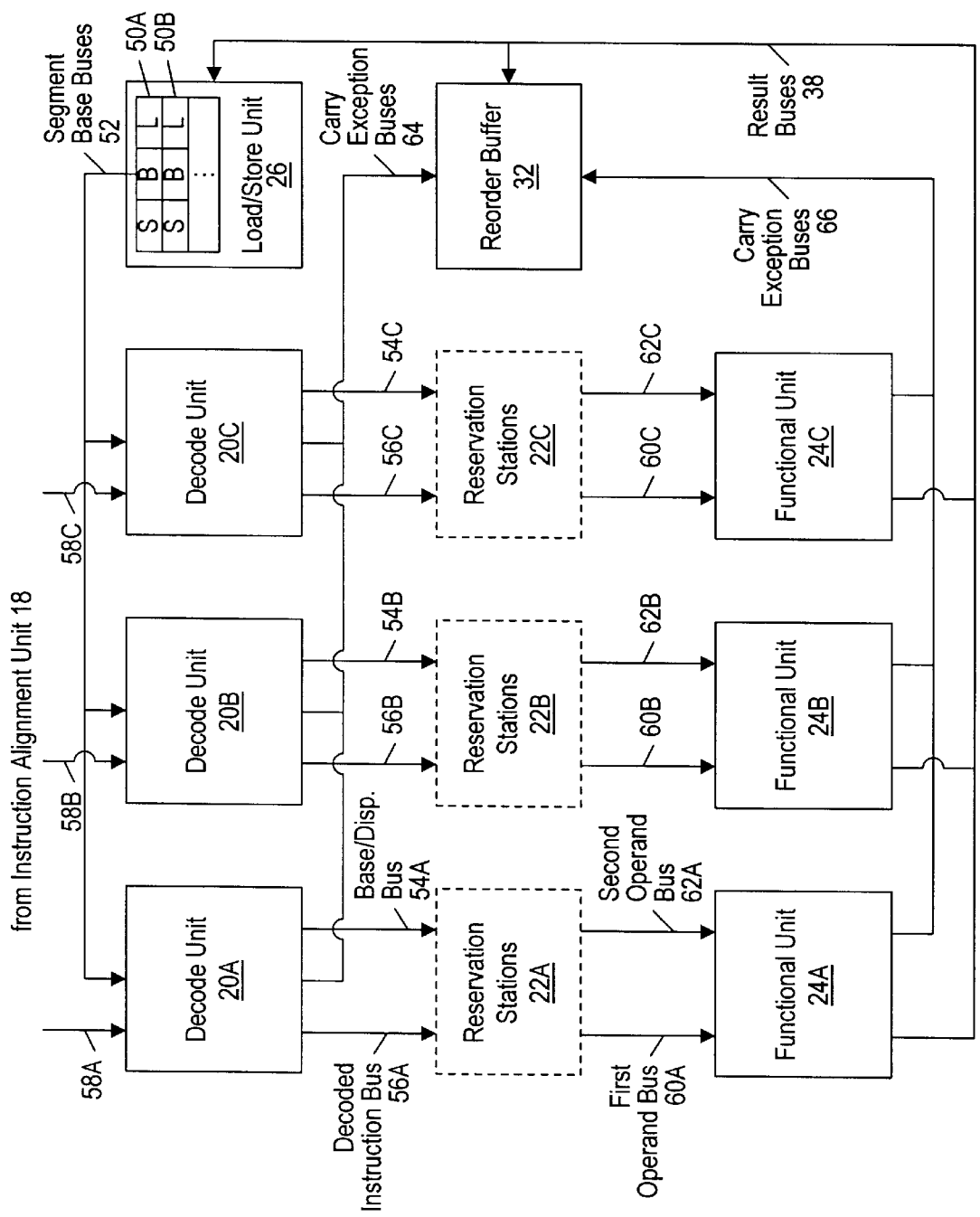
FIG. 3 is a block diagram of the decode units, reservation stations, functional units, load/store unit, and reorder buffer shown in FIG. 1, highlighting interconnection between the units according to one embodiment of the microprocessor.

Turning next to FIG. 3, a block diagram of decode units 20, reservation stations 22, functional units 24, reorder buffer 32, and load/store unit 26 is shown. Interconnections between the units are shown in accordance with one embodiment of microprocessor 10. Load/store unit 26 includes a plurality of segment registers such as segment registers 50A and 50B. Each segment register 50 includes storage sufficient for storing a segment selector (shown as S in segment registers 50), a segment base address (shown as B in segment registers 50), and a segment limit (shown as L in segment registers 50). Additionally, segment access information is stored in segment registers 50 (not shown). The segment selector is used to identify the segment translation information within a descriptor table defined to store a plurality of segment definitions. When the descriptor is stored into the segment register (via a particular instruction), the corresponding segment translation information is automatically read by microprocessor 10 from main memory. It is noted that, when microprocessor 10 is operating in "real mode" as defined by a processor state register (not shown), the segment base address is the descriptor value shifted left by four bits. In one embodiment, load/store unit 26 includes six segment registers 50 corresponding to the x86 microprocessor architecture-defined segment registers (i.e. CS, SS, DS, ES, FS, and GS).

A plurality of segment base buses (represented by reference number 52 in FIG. 3) are coupled between load/store unit 26 and decode units 20. The segment base address corresponding to each segment register 50 is conveyed upon segment base buses 52 to decode units 20. Each decode unit 20A–20C additionally receives an instruction from instruction alignment unit 18 upon an instruction bus 58A–58C. Decode units 20 select the segment base address corresponding to the segment register referenced by the received instruction. An instruction references a segment register if the segment register is the default segment register for the instruction and no override is specified via a prefix byte included in the instruction. Conversely, an instruction references a segment register specified by the prefix byte when the prefix byte is included in the instruction. It is noted that each decode unit 20 may maintain a duplicate copy of segment registers 50 instead of receiving segment base buses 52, in another embodiment.

Each decode unit 20A–20C adds the selected segment base address to the displacement included in the received instruction. The sum thus generated is conveyed to the corresponding reservation station 22A–22C and thereafter to the corresponding functional unit 24A–24C. A base/displacement bus 54A–54C is coupled between each decode unit 20A–20C and the corresponding reservation station 22A–22C for conveying the sum of the selected segment base address and the displacement. Additionally, a decoded instruction bus 56A–56C is coupled between each decode unit 20A–20C and the corresponding reservation station 22A–22C for conveying decoded instructions to reservation stations 22.

Reservation stations 22 store decoded instructions received upon decoded instruction buses 56. Additionally, corresponding operands and segment base/displacement sums received upon base/displacement buses 54 are stored. When operands associated with the instruction have been provided, the instruction may be selected for execution. The reservation station 22A–22C storing the instruction conveys the operands for the instruction upon first and second operand buses to the corresponding functional unit 24A–24C. Additionally, control signals (not shown) indicate the operation to be performed. During address generation cycles, an addition is performed. The operands conveyed are one of the register operands and the segment base/dispatch sum. First operand buses 60A–60C and second operand buses 62A–62C are coupled between reservation stations 22A–22C and corresponding functional units 24A–24C for conveyance of the operands. It is noted that, in cases in which a reservation station 22A–22C is not storing instructions or is storing instructions which lack operand values, a decoded instruction may progress through the reservation station 22A–22C to the corresponding functional unit 24A–24C in a single clock cycle. The decoded instruction must receive its register operands during the clock cycle it is conveyed from a decode unit 20A–20C to reservation stations 22A–22C in order for such operation to occur. Hence, reservation stations 22 are shown as dashed enclosures instead of blocks in FIG. 3. Additionally, embodiments of microprocessor 10 which do not include reservation stations 22 are contemplated.

When a functional unit 24A–24C receives an address generation operation, the values upon the corresponding first operand bus 60A–60C and second operand bus 62A–62C are added, producing a result upon result buses 38. Reorder buffer 32 and load/store unit 26 are coupled to result buses 38. Additionally, reservation stations 22 are coupled to result buses 38 (not shown in FIG. 3). Result buses 38 may include one result bus for each functional unit 24A–24C (as well as buses for load/store unit 26). If a particular functional unit 24A–24C is completing the address generation corresponding to an instruction, load/store unit 26 records the address for later access to data cache 28. If the particular functional unit 24A–24C is performing the first portion of a two cycle address generation operation (i.e. the functional unit is adding one of two register operands to the segment base/displacement sum), then load/store unit 26 does not record the value. Instead, a reservation station 22A–22C which is storing the second portion of the address generation operation receives the value. Subsequently, the value is added to the second of two register operands corresponding to the instruction. For the embodiment shown, it is noted that the two portions of an address generation operation are performed by two different functional units 24 (i.e. the SIB byte instructions are double dispatch instructions, as described with respect to FIG. 2). Other embodiments may perform both portions of the address generation within a single functional unit 24.

As noted above, if microprocessor 10 is executing instructions from a segment which specifies 16 bit logical addresses or if a particular instruction specifies 16 bit logical addresses, decode units 20 and functional units 24 detect an arithmetic carry from the low order 16 bits of an address generation operation to the high order 16 bits. If such a carry is detected, a corresponding indication is asserted to reorder buffer 32. The indication identifies the instruction for which the carry is detected. Reorder buffer 32 notes an exception for the corresponding instruction. A first set of carry exception buses 64 are coupled between decode units 20 and reorder buffer for providing notification of the carry. Similarly, a second set of carry exception buses 66 are coupled between functional units 24 and reorder buffer 32.

It is noted that carry exception buses 64 and 66 may comprise a single signal per decode unit 20 or functional unit 24 indicative, when asserted, that a carry has been detected. For carries detected by decode units 20, the reorder buffer storage location previously allocated to the instruction may be discerned by reorder buffer 32. For functional units 24, the reorder buffer tag corresponding to the instruction is conveyed upon result buses 38 concurrently with the assertion of the carry exception signal. It is further noted that an arithmetic carry is detected when the result of adding a pair of n-bit numbers is an (n+1)-bit number. In the present embodiment, for example, if the addition of the low order sixteen bits of the segment base address and the displacement corresponds to a seventeen bit number, an arithmetic carry is detected.

Upon retirement of a particular instruction which generated the aforementioned carry, MROM unit 34 is notified that the instruction is to be executed therein. Additionally, reorder buffer 32 flushes instructions subsequent to the particular instruction. It is noted that any mechanism (besides instruction flush) may be employed by microprocessor 10 to restart instruction execution at the appropriate instruction. MROM unit 34 parses the instruction into a series of addition instructions followed by the original instruction. The addition instructions form the logical data address within a register, then use that register as an operand to form the address of the original instruction. Each of the addition instructions performs a 16 bit addition, thereby forming the logical address including truncation of the carry. The correct logical address generation may thereby be achieved. For example, if the instruction:

ADD AX, [BX+DI+disp16]

(where disp16 is a 16 bit displacement) is detected to have an arithmetic carry from the low order sixteen bits and microprocessor 10 is executing code which specifies 16 bit logical addresses, the following code sequence may be generated by MROM unit 34:

MOV temp, imm16
ADD temp, DI
ADD temp, BX
ADD temp, seg_base
ADD AX, [temp]

In the example, temp is a temporary storage location included within microprocessor 10 for use by MROM unit 34. For example, temp may be a storage location with register file 30 (other than the storage locations used for the general registers). Additionally, imm16 is an immediate field equal to disp16. By executing the first four instructions generated by MROM unit 34, the operand values of the original instruction are added as the operands of the instruction, rather than as operands for forming the logical data address of the instruction. Therefore, microprocessor 10 adds the segment base address to the values at the fourth instruction, after the carry has been properly handled by the first three instructions. Following execution of the third instruction, temp stores the logical address corresponding to [BX+DI+disp16]. Microprocessor 10 is configured to accept the address formed by the fifth instruction as a linear address. Other embodiments may eliminate the fourth instruction and add the segment base address during execution of the fifth instruction, similar to execution of fast path instructions.

In one exemplary embodiment of microprocessor 10 employing the x86 microprocessor architecture, Table 1 below shows the addressing modes for 32-bit logical addressing and the corresponding values conveyed upon first operand buses 60 and second operand buses 62 when the corresponding instruction is executed. Table 2 shows the addressing modes for 16-bit logical addressing and the corresponding values conveyed. In cases where two cycles are used to compute the address, the first row for the addressing mode is the first portion of the computation and the second row is the second portion of the computation. It is noted that the operands may be swapped between first and second operands with no affect upon the results. The symbol "reg" in the tables corresponds to a register operand. The symbol "disp" followed by a particular number refers to a displacement having the particular number of bits.

TABLE 1 x86 32-bit Addressing Modes

| Addressing Mode | First Operand | Second Operand |
| --- | --- | --- |
| [reg] | base | reg |
| disp32 | base+disp32 | none |
| disp8+[reg] | base+disp8 | reg |
| disp32+[reg] | base+disp32 | reg |
| [reg1+s*reg2]+disp | base+disp | reg1 |
| (second cycle) | sum from row 1 | s*reg2 |

TABLE 2 x86 16-bit Addressing Modes

| Addressing Mode | First Operand | Second Operand |
| --- | --- | --- |
| [reg] | base | reg |
| disp16 | base+disp16 | none |
| disp8+[reg] | base+disp8 | reg |
| disp16+[reg] | base+disp16 | reg |
| [reg1+reg2] | base | reg1 |
| (second cycle) | sum from row 1 | reg2 |
| [reg1+reg2]+disp | base+disp | reg1 |
| (second cycle) | sum from row 1 | reg2 |

Figure 4:
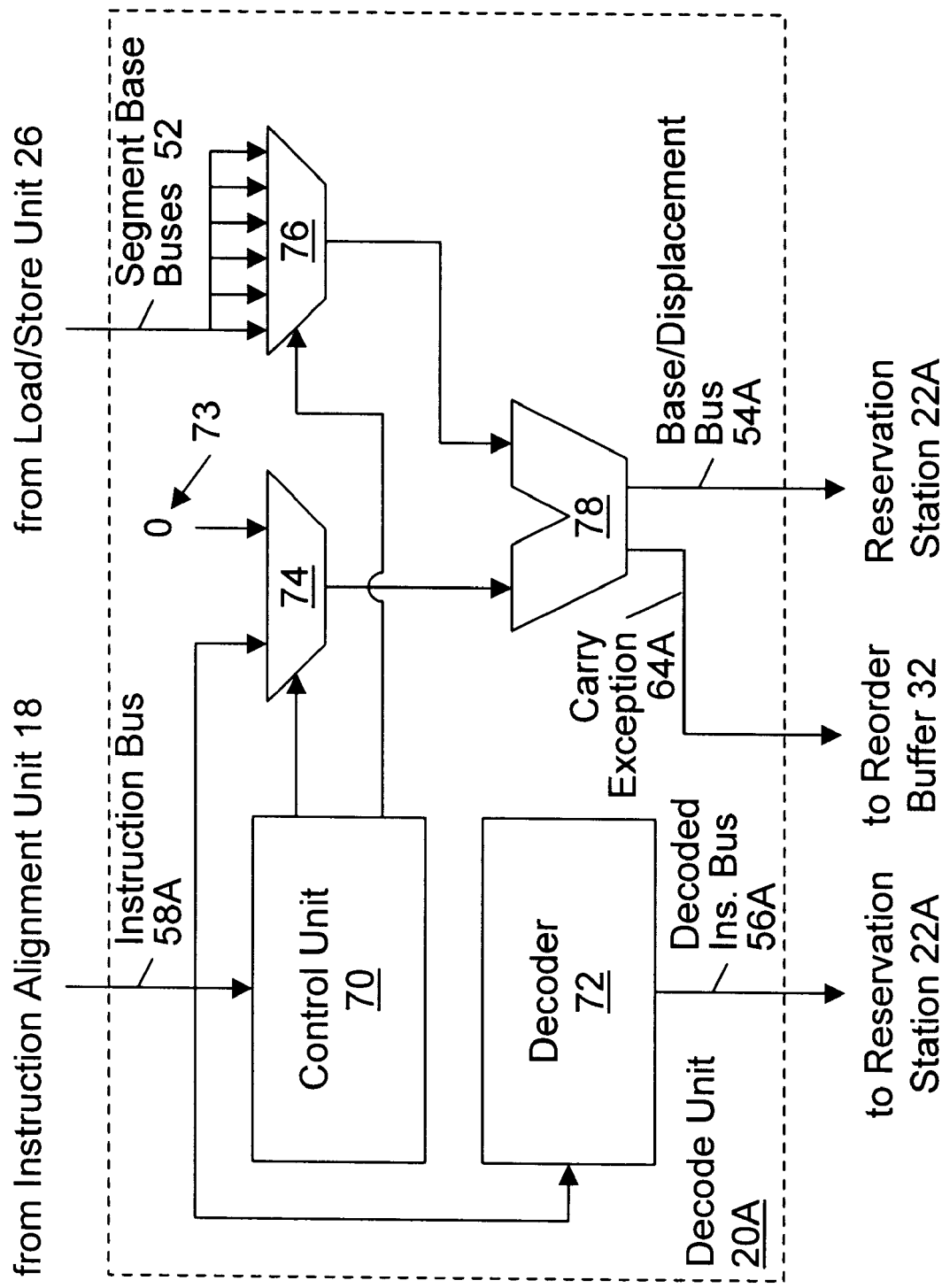
FIG. 4 is a diagram of one embodiment of one of the decode units shown in FIG. 3.

Turning next to FIG. 4, an embodiment of decode unit 20A is shown. Decode units 20B and 20C may be configured similarly. Decode unit 20A receives instruction bus 58A from instruction alignment unit 18, as well as segment base buses 52 from load/store unit 26. Decode unit 20A is also coupled to decoded instruction bus 56A and base/displacement bus 54A, which are further coupled to reservation station 22A. Still further, decode unit 20A is coupled to carry exception conductor 64A, which forms a portion of carry exception bus 64.

In the embodiment shown, decode unit 20A includes a control unit 70, a decoder 72, a displacement selection circuit 74, a segment selection circuit 76, and an adder circuit 78. Instruction bus 58A is coupled to control unit 70, decoder 72, and displacement selection circuit 74. Segment base buses 52 are coupled to segment selection circuit 76. Both selection circuits 74 and 76 are coupled as inputs to adder circuit 78, which is further coupled to base/displacement bus 54A and carry exception conductor 64A. Additionally, decoder 72 is coupled to decoded instruction bus 56A. Finally, control unit 70 is coupled to both selection circuits 74 and 76.

Control unit 70 is configured to assert control signals to selection circuits 74 and 76 in order to convey values to adder circuit 78. Displacement selection circuit 74 supplies the displacement corresponding to the instruction, and segment selection circuit 74 supplies the segment base address corresponding to the instruction. In order to select the displacement, control unit 70 detects the displacement data from the instruction and selects the bytes from instruction bus 58A accordingly. The displacement may be 8, 16, or 32-bits according to one embodiment, but displacement selection circuit 74 provides 32 bits to adder circuit 78. For 8 or 16 bit displacements, selection circuit 74 extends the conveyed value by sign extending the displacement to 32 bits. If no displacement is included in the instruction, selection circuit 74 selects a zero displacement (shown as reference number 73) for the displacement value conveyed to adder 78.

In a similar fashion, control unit 70 asserts control signals to segment selection circuit 76 in order to select one of the segment base addresses from segment base buses 52. Control unit 70 detects a segment override prefix byte, if included, and causes segment selection circuit 76 to select the corresponding segment base address. If no segment override prefix byte is included in the instruction, control unit 70 decodes the instruction in order to determine the default segment register defined for that instruction. The corresponding segment base address is then selected. It is noted that selection circuits 74 and 76 comprise circuitry for selecting one of several input values to convey as an output value in response to control signal inputs (from control unit 70, in this case). The selection circuits may comprise a multiplexor circuit, or may comprise multiple cascaded multiplexor circuits, according to various embodiments.

Adder circuit 78 receives the selected displacement and segment register values and adds the values. The sum is conveyed upon base/displacement bus 54A. Additionally, adder circuit 78 is configured to indicate a carry from the low-order 16 bits of the addition to the high-order 16 bits. The carry is indicated via an asserted signal upon carry exception conductor 64A. Lastly, decoder circuit 72 decodes the received instruction into a set of control bits stored by reservation station 22A. The set of control bits comprises the decoded instruction, which is a format suitable for execution by functional units 24.

It is noted that the circuitry shown in FIG. 4 may be included within opcode decode unit 44A, as shown in FIG. 2. In such an embodiment, the displacement corresponding to the instruction is detected and routed separate from the remaining instruction information to opcode decode unit 44A. Therefore, control unit 70 need not provide selection controls for expanding 8 and 16 bit displacements, since the displacements are expanded by early decode unit 40A. Additionally, decoder 72 is limited to opcode decode functions in such an embodiment.

Figure 5:
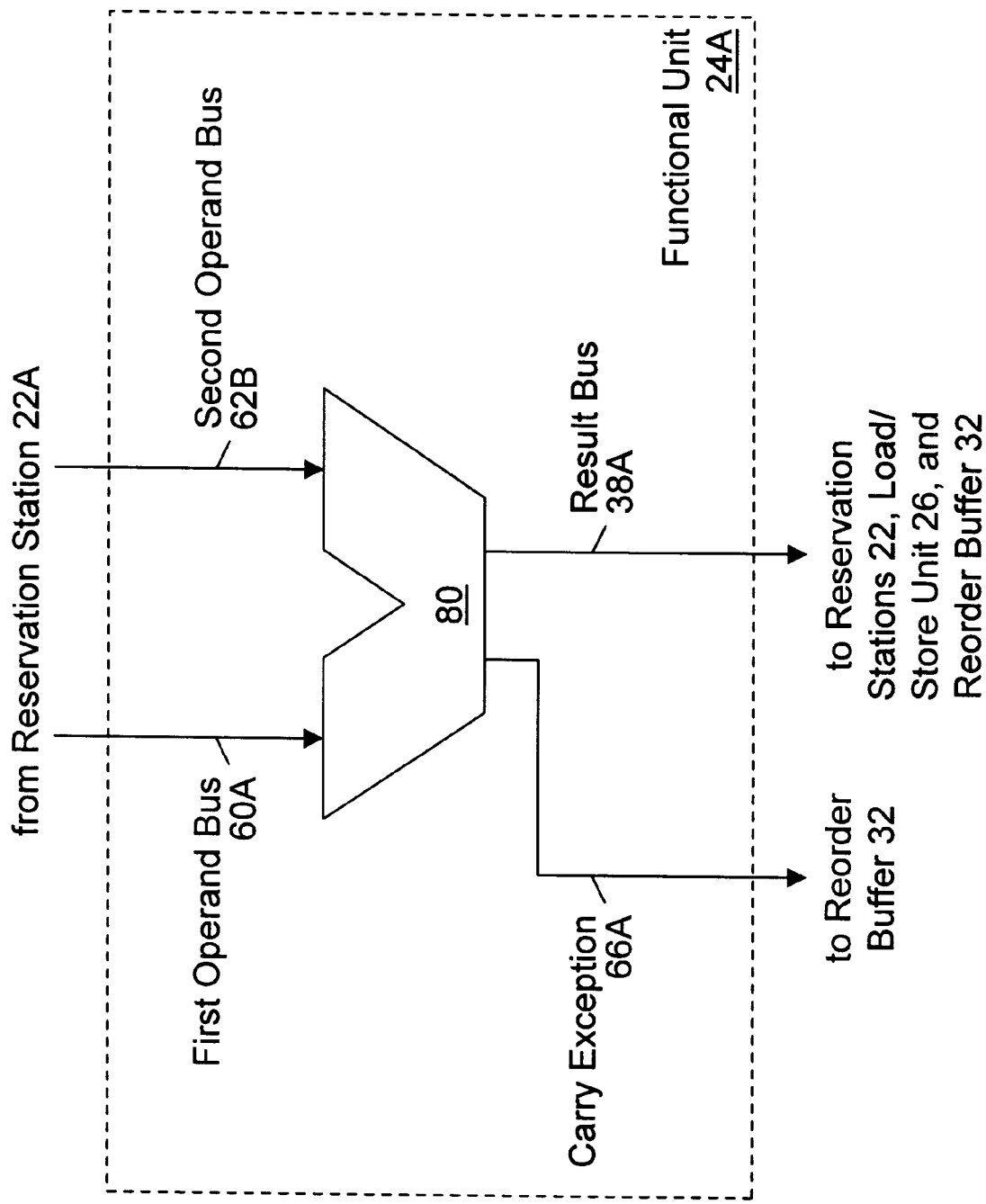
FIG. 5 is a diagram of one embodiment of one of the functional units shown in FIG. 3.

Turning next to FIG. 5, an embodiment of functional unit 24A is shown. Functional units 24B and 24C may be configured similarly. Only those circuits employed for address generation are shown in FIG. 5. Additional well-known circuitry may be included for performing other instruction execution functions. Functional unit 24A includes an adder circuit 80. Inputs to adder circuit 80 come from first operand bus 60A and second operand bus 62B. The sum of the input values is conveyed upon result bus 38A (one of result buses 38) along with a reorder buffer tag identifying the associated instruction. Additionally, a carry from the low-order 16 bits of the sum to the high-order 16 bits of the sum is indicated via an asserted signal upon carry exception conductor 66A (part of carry exception bus 66 shown in FIG. 3)

When functional unit 24A is performing the first portion of an address generation which requires two cycles, the sum of the displacement and the segment base address is received upon first operand bus 60A and one of the register operands is received upon second operand bus 62B. When functional unit 24A is performing the second portion of an address generation requiring two cycles, the sum from the first portion is received upon first operand bus 60A and the second register operand is received upon second operand bus 62A. Therefore, the most complex address generation supported by the present embodiment (involving a segment base address, a displacement, and two register operands) utilizes a three step addition process. First, the displacement and base are added by an adder circuit similar to adder circuit 78 shown in FIG. 4. The sum from adder circuit 78 is then added by adder circuit 80 to one of the register operands. Subsequently, adder circuit 80 or a similar adder circuit adds the sum produced by the first adder circuit 80 to the second register operand. If a second register operand is not included, only one adder circuit 80 is used to perform address generation. It is noted that, if adder circuit 80 is implemented as a three input adder, address generation may be completed in one iteration of functional unit 24A regardless of which set of up to three operands are used to form the logical address.

Figure 6:
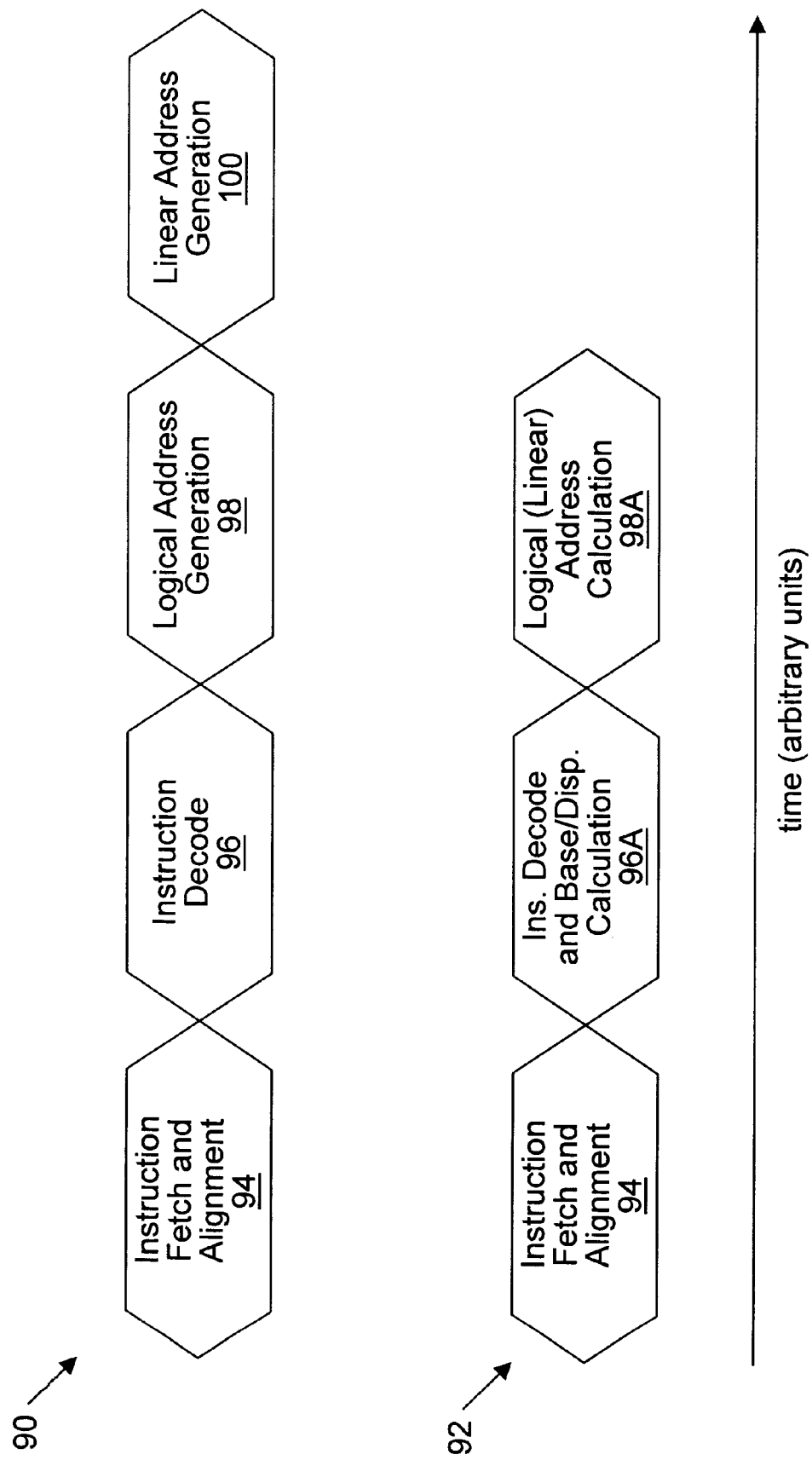
FIG. 6 is a diagram depicting logical flow of an instruction through linear address generation with and without the apparatus shown in FIGS. 3 through 5.

Advantages of the present structure may be further illuminated through examination of FIG. 6. FIG. 6 shows a logical flow 90 of the steps performed from fetching an instruction to the generation of a linear address for that instruction without implementation of the apparatus described herein with respect to FIGS. 3 through 5. Additionally, a logical flow 92 is shown illustrating the steps with implementation of the apparatus shown herein. One or more clock cycles may elapse for each step, but the number of clock cycles for equivalent steps between logical flow 90 and logical flow 92 are equal. Subsequent to completion of logical flow 90 or 92, an instruction performs data access. Other clock cycles through completion of the instruction may be similar for either logical flow.

Both logical flow 90 and 92 include an instruction fetch step 94. The instruction is fetched from instruction cache 16 and conveyed to a decode unit 20A–20C through instruction alignment unit 18. During a step 96 in logical flow 90, the instruction is decoded by the receiving decode unit 20A–20C. In a step 96A of logical flow 92, the instruction is decoded. In addition, the segment base address corresponding to the instruction is added to the displacement value corresponding to the instruction. Steps 96 and 96A utilize substantially the same amount of time. During a step 98 of logical flow 90, logical address generation is performed using up to one displacement and two register operand values. During a step 100, linear address generation is then performed by adding a segment base address to the logical address generated during step 98. In logical flow 92, however, the addition of the segment base address represented by step 100 is performed during step 96A. Therefore, linear address generation is completed during a step 98A similar to step 98. Advantageously, the time elapsed during step 100 is eliminated from the linear address generation using the apparatus described herein.

It is further noted that the above description discussed 32 bit addresses and handling the case of a 16 bit carry for 16 bit addressing mode. However, larger addresses may be formed by embodiments of microprocessor 10. For example, 64 bit addressing may be used. Sixty-four bit addressing would then detect carries from both the sixteenth bit (for 16 bit addressing mode) and the thirty-second bit (for 32 bit addressing mode). Similar corrective actions are required for 16 and 32 bit carries. Still further, any size address may be employed as long as the various addressing modes are handled correctly.

It is still further noted that, since the logical address is not expressly generated using the current apparatus, segment limit checking is modified. Instead of checking the logical address against the segment limit stored in the segment descriptor, the linear address is checked against a linear limit. The linear limit is formed by adding the segment limit to the segment base address. Additionally, it is noted that the present apparatus exploits the fact that the segment register values are modified less frequently than registers in register file 30, for example. When an instruction is detected which modifies one of the segment registers, instruction execution may be stalled until the update is completed.

Although the above description uses the x86 microprocessor architecture as an exemplary embodiment, it is noted that any microprocessor architecture which includes segmentation may benefit from the present disclosure. Furthermore, any address translation structure which adds a relatively stable value (such as a segment base address) to values which are often changes (such as register values) may employ a structure similar to that disclosed herein. Such embodiments are intended to be within the spirit and scope of the appended claims.

Figure 7:
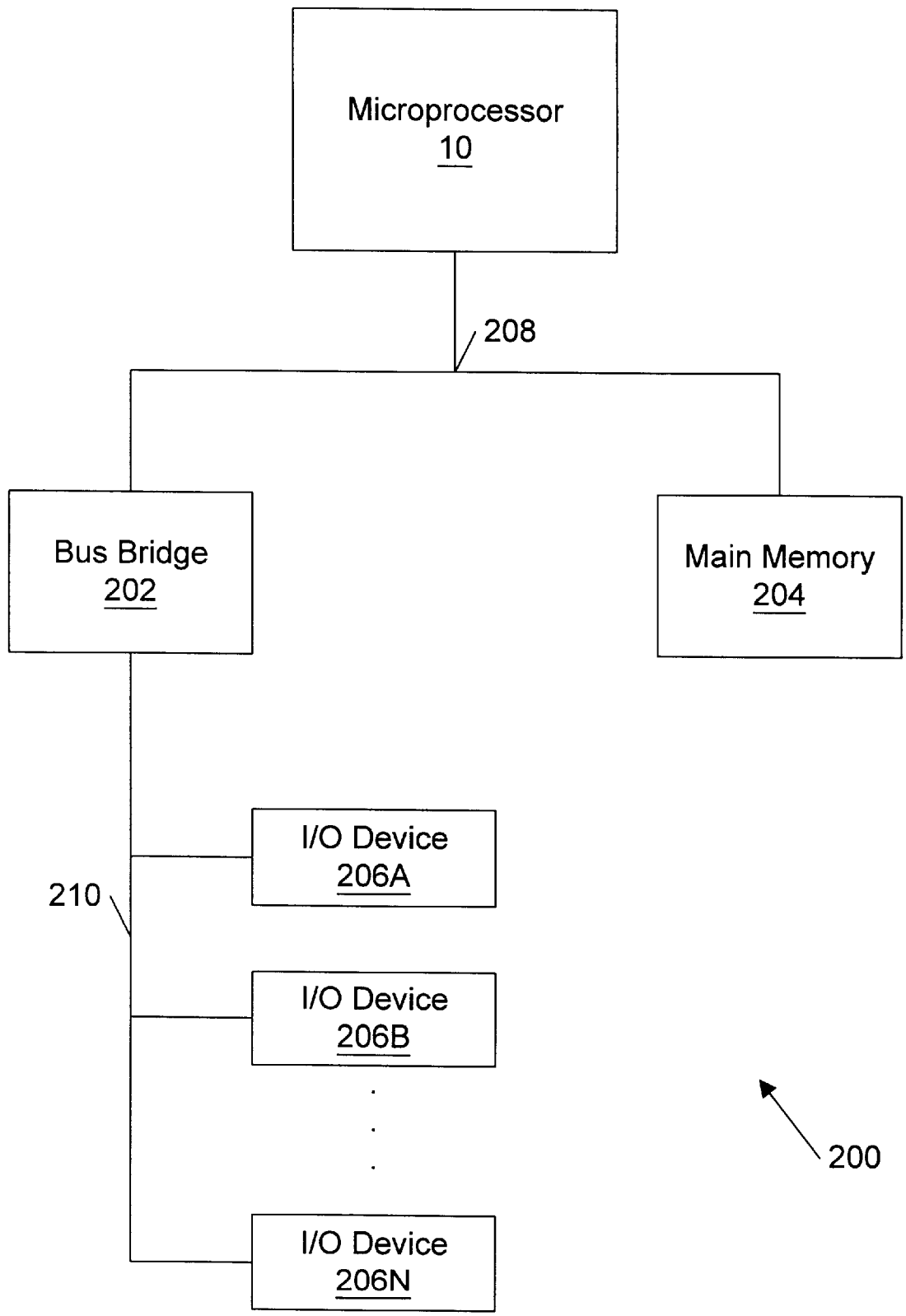
FIG. 7 is a diagram of a computer system including the microprocessor shown in FIG. 1.

Turning now to FIG. 7, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 108 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 7 includes one microprocessor, other embodiments of computer system 200 may include multiple microprocessors. Similarly, computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 3 below indicates fast path, double dispatch, and MROM instructions for one embodiment of microprocessor 10 employing the x86 instruction set:

TABLE 3 x86 Fast Path, Double Dispatch, and MROM Instructions

| x86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |

TABLE 3-continued x86 Fast Path, Double Dispatch, and MROM Instructions

| x86 Instruction | Instruction Category |
|---|---|
| BTC | fast path |
| BTR | fast path |
| BTS | fast path |
| CALL | fast path |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV CR | MROM |
| MOV DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | MROM |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered fast path instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473 filed Jan. 2, 1996 by Narayan, et al. The disclosure of these patent applications are incorporated herein by reference in their entirety.

In accordance with the above disclosure, an apparatus for reducing the latency for generating linear addresses in a segmented translation mechanism has been described. Advantageously, overall instruction throughput may be increased when the apparatus is employed. Due to the increased instruction throughput and decreased data access latency, microprocessor performance may be increased. The apparatus disclosed herein additionally detects certain error conditions associated with 16 bit logical addressing. When such conditions are detected, subsequent instructions are flushed and the instruction is handled by a microcode unit.

Numerous variations and modifications will become apparent to those skilled in the art once the above disclosure is fully appreciated. It is intended that the following claims be interpreted to embrace all such variations and modifications.

What is claimed is:

1. An apparatus for computing a linear address, comprising:
   a plurality of registers configured to store a plurality of segment base addresses;
   a first adder circuit coupled to receive one of said plurality of segment base addresses from said plurality of segment registers, wherein said first adder circuit is configured to add said one of said plurality of segment base addresses to a displacement corresponding to an instruction, thereby producing a first sum; and
   a second adder circuit coupled to receive said first sum from said first adder circuit, wherein said second adder circuit is configured to add said first sum to an operand of said instruction, thereby producing a second sum.

2. The apparatus as recited in claim 1 further comprising a third adder circuit coupled to receive said second sum, wherein said third adder circuit is configured to add said second sum to another operand of said instruction, thereby producing said linear address.

3. The apparatus as recited in claim 1 wherein said first adder circuit is configured to produce a first indication of a carry from a particular bit of said first sum.

4. The apparatus as recited in claim 3 wherein said second adder circuit is configured to produce a second indication of said carry from said particular bit of said second sum.

5. The apparatus as recited in claim 4 wherein said particular bit comprises a sixteenth bit of said first sum and said second sum.

6. The apparatus as recited in claim 1 further comprising a first selection circuit coupled between said first adder and said plurality of segment registers, wherein said first selection circuit is configured to select said one of said plurality of segment base addresses from said plurality of segment base addresses.

7. The apparatus as recited in claim 6 further comprising a control unit coupled to said first selection circuit, wherein said control unit is coupled to receive said instruction, and wherein said control unit causes said first selection device to select said one of said plurality of segment base addresses, and wherein said one of said plurality of segment base addresses is stored within one of said plurality of segment registers, and wherein said one of said plurality of segment registers is specified by said instruction.

8. The apparatus as recited in claim 7 wherein said control unit is configured to cause selection of a default one of said plurality of segment registers to provide said one of said plurality of base addresses if said instruction does not specify one of said plurality of segment registers.

9. The apparatus as recited in claim 7 further comprising a second selection circuit coupled to said first adder circuit and to said control unit, wherein said second selection circuit is configured to provide said displacement to said first adder circuit.

10. The apparatus as recited in claim 9 wherein said control unit is configured to cause said second selection circuit to select a zero displacement if said displacement is not included within said instruction.

11. The apparatus as recited in claim 1 further comprising a reservation station coupled between said first and second adders, wherein said reservation station is configured to temporarily store said first sum.

12. A method for calculating a linear address corresponding to an instruction within a microprocessor, said instruction having a displacement and one or more operands, said method comprising:
   adding a segment base address to said displacement, thereby producing a first sum, wherein said first sum is produced by a first adder circuit within said microprocessor;
   thereafter adding said first sum to said one or more operands, thereby producing a second sum, wherein said second sum is produced by a second adder circuit within said microprocessor.

13. The method as recited in claim 12 wherein said displacement has a value of zero.

14. The method as recited in claim 12 further comprising detecting a carry from a particular bit during said adding a segment base address, said adding said first sum, and said adding said second sum.

15. The method as recited in claim 14 further comprising generating an exception for said instruction upon said detecting.

16. The method as recited in claim 15 further comprising calculating said linear address in a microcode unit of said microprocessor upon taking said exception.

17. The method as recited in claim 12 wherein said step of adding a segment base address to said displacement is accomplished at a first point in time at which at least one of said one or more operands is unavailable and wherein said step of adding said first sum to said one or more operands is accomplished at a second point in time at which said first one of said operands is available.

18. An apparatus for computing a linear address specified by an instruction, said instruction having a displacement and one or more operands, said apparatus comprising:

a decode unit configured to add one of a plurality of segment base addresses to said displacement, thereby producing a first sum; and a second unit coupled to said decode unit, said second unit being configured to receive said first sum from said decode unit and add said first sum to said one or more operands, thereby producing a linear address.

19. The apparatus as recited in claim 18 wherein said second unit comprises a functional unit.

20. The apparatus as recited in claim 18 wherein said second unit comprises a load/store unit.

* * * * *